3,153,450
DECREASING FLUID LOSS IN TREATMENT OF WELLS
Gerald L. Foster and Billy D. Oakes, Tulsa, Okla., assignors to The Dow Chemical Company, Midland, Mich., a corporation of Delaware
No Drawing. Filed Aug. 26, 1957, Ser. No. 680,392
11 Claims. (Cl. 166—42)

The invention concerns an improved fluid composition for treating a petroliferous formation. It more particularly concerns such composition which undergoes less fluid loss in the formation and is therefore a more economical and more efficient fracturing fluid than fracturing fluids commonly used.

Various compositions have been proposed to reduce fluid loss in well-treating compositions, e.g., soap thickeners, such as aluminum stearate, and certain natural gums, such as tragacanth and karaya. Among the general types of fracturing compositions are oil-base and water-base fracturing fluids.

In our copending application, Serial No. 654,443, filed April 23, 1957, since abandoned, there is described a low fluid-loss oil-base fracturing fluid consisting essentially of a petroleum oil, e.g., kerosene, containing a soap, preferably that resulting from reacting tall oil with an alkali metal hydroxide, and containing from 0.25 to 16.0 pounds of finely divided mineral per thousand gallons of oil, the particle size of the mineral being between 15,000 and 60,000 Angstrom units. The invention therein described was limited to an oil-base fracturing fluid. The instant invention is directed toward an improved water-base fracturing fluid.

The invention described in the copending application and the instant invention are not to be confused with the known use of sand, generally of about 20 to 40 mesh, employed as a propping agent. It is a common observation that propping sand does not at all aid in reducing fluid loss. A need, therefore, exists for a reduction in the fluid loss of water-base fracturing fluids.

We have now discovered that the fluid loss of water-base fracturing fluids may be reduced by admixing into the water both a gum thickening agent and a relatively small quantity of a fine mineral having maximum particle dimensions of between 15,000 and 60,000 Angstrom units. There may also be suspended in the fracturing fluid a conventional propping agent, e.g., from 0.5 to 10.0 pounds of a flint-shot sand such as Ottawa sand of a particle size between 20 and 40 mesh, per gallon of fluid.

The invention, therefore, comprises an improved water-base fracturing fluid and the method of making the improved fluid.

The vehicle or carrier liquid of the invention is water or an aqueous solution, e.g., an inorganic acid, such as a 5 to 25 percent solution of HCl and preferably 10 to 15 percent HCl containing a corrosion inhibitor such as is described in U.S. Patent 1,877,504.

The gum is employed in an amount between 3.5 and 830 pounds per 1,000 gallons of the fracturing fluid or composition but is preferably between 3.5 and 166 pounds per 1,000 gallons of the composition. The gum is pulverized to a particle size of between 20 and 200 mesh but usually to about 100 mesh (U.S. Standard Sieve Series).

The fine sand is employed in an amount between 0.25 and 1,000 pounds per 1,000 gallons of the fracturing composition, but is preferably between 1 and 100 pounds per 1,000 gallons of the composition.

The gum, after being pulverized, is admixed with the water or acid solution. After it is mixed into the solution, which usually requires a mixing period of from 0.5 to 2 or 3 minutes in a conventional stirring apparatus,

TABLE

*Fluid Loss of Gum-Thickened Aqueous-Base Fracturing Fluids With and Without Fine Sand*

| Run No. | Pounds of gum/1,000 gal. | Aqueous Liquid | Viscosity (cps.) | Fine Sand [7] in lb./1,000 gal. | Fluid Loss API Code 29, ml. in 30 min. |
|---|---|---|---|---|---|
| 1 | 40 Guar [1] | Water | 60 | 0 | 48. |
| 2 | do | do | 60 | 16 | 28. |
| 3 | do | 10% HCl | 90 | 0 | 40. |
| 4 | do | do | 90 | 16 | 25. |
| 5 | 3.5 Guar | Water | 4 | 0 | 127. |
| 6 | do | do | 4 | 16 | 44. |
| 7 | 83 Karaya [2] | do | 18.5 | 0 | 39. |
| 8 | do | do | 18.5 | 16 | 28. |
| 9 | do | 10% HCl | 10 | 0 | 51. |
| 10 | do | do | 10 | 16 | 29. |
| 11 | 83 Tragacanth [2] | Water | 13 | 0 | 24. |
| 12 | do | do | 13 | 16 | 15. |
| 13 | do | 10% HCl | 29 | 0 | 21. |
| 14 | do | do | 29 | 16 | 14. |
| 15 | 83 Talha [2] (arabic) | Water | 14 | 0 | 142. |
| 16 | do | do | 14 | 16 | 99. |
| 17 | do | 10% HCl | 19 | 0 | 135. |
| 18 | do | do | 19 | 16 | 84. |
| 19 | 83 Damar [2] | Water | 4 | 0 | 185. |
| 20 | do | do | 4 | 16 | 79. |
| 21 | do | 10% HCl | 3 | 0 | 210. |
| 22 | do | do | 3 | 16 | 110. |
| 23 | 83 Irish Moss [3] (chondrus) | Water | 21 | 0 | 22. |
| 24 | do | do | 21 | 16 | 20. |
| 25 | do | 10% HCl | 18 | 0 | 25. |
| 26 | do | do | 18 | 16 | 21. |
| 27 | 6.3 Sodium Polyacrylate [4] | Water | 14 | 0 | 300 ml.—0.5 min. |
| 28 | do | do | 14 | 16 | 300 ml.—1.5 min. |
| 29 | 6.3 Sodium Polyacrylete [5] | do | 14 | 0 | 300 ml.—0.45 min. |
| 30 | do | do | 14 | 16 | 300 ml.—2 min. |
| 31 | 75 Polyacrylamide [6] | do | 23 | 0 | 300 ml.—10 min. |
| 32 | do | do | 23 | 16 | 180 ml.—30 min. |

[1] Guar is a seed extract.
[2] Karaya, tragacanth, talha, and damar are tree exudations.
[3] Irish moss is a seaweed colloid.
[4] Sodium Polyacrylate (a synthetic gum)—molecular weight, 75,000.
[5] Sodium Polyacrylate (synthetic gum)—molecular weight, 150,000.
[6] Polyacrylamide (a synthetic gum)—molecular weight, 2,000,000.
[7] Malvern Mineral Company silica sand, maximum dimensions of between 15,000 and 60,000 Angstrom units.

the resulting mixture is allowed to stand for about ½ hour. The fine sand is then admixed therein. The gums which may be employed in the invention include guar, locust bean (Carob seed), karaya, tragacanth, gum arabic, talha, damar, Irish moss and synthetic gums such as polyacrylamide and salts of polyacrylic acid. The finely divided mineral may be silica, alumina, nephelite, ball clay, kaolinite, bentonite, illite, barytes, talc, Portland cement, plaster of Paris, or pulverulent igneous rock, e.g., nepheline syenite, feldspar, and noritic anorthosite. Fine silica sand is preferred. The fine mineral and the gum have a synergistic effect in preventing or reducing fluid loss not attainable by either additive alone.

The preceding table shows the effect of adding the fine sand to an aqueous-base fracturing fluid containing either a vegetable gum or a synthetic gum.

An examination of the table shows that the fluid loss was definitely lessened when both the gum and the fine sand of the invention were present in the fracturing fluid. The even-numbered runs of the table are illustrative of the invention whereas the odd-numbered runs are for comparison purposes.

The following example of a well-treatment is illustrative of a mode of practicing the inventinon.

2,000 gallons of water were placed in a 5,000 gallon capacity mixing tank equipped with a stirrer consisting of a central axle to which revolving paddles were radially attached. 160 pounds of guar gum of about 100 mesh were placed in a separate container provided with a propeller-type stirrer. Guar is a natural colloid obtained by refining the endosperm of the seed of the guar (*Cyamopsis tetragonoloba*). 24 gallons of methyl alcohol were admixed with the guar gum to form a slurry to impart improved water-wetting properties to the guar gum. The gum-alcohol slurry was then admixed with the water in the mixing tank. Mixing was continued for about 10 minutes after which a substantially homogeneous mixture resulted. Another 2,000 gallons of water were then admixed with the guar gum-water mixture in the mixing tank.

50 pounds of fine silica sand having a particle size maximum dimension of between 15,000 and 60,000 Angstrom units were then added to the mixture in the mixing tank and mixing continued for about 15 minutes. 4,000 pounds of 20 to 40 mesh Ottawa sand as a propping agent were then admixed by means of a conventional sand blender into the composition prepared according to the invention.

The composition thus prepared was used to fracture petroliferous strata of reduced permeability in a water-flood producing area of the Strawn formation in Jack County, Texas, by pumping it down an injection well. The strata to be fractured lay between the injection well and the output well. Between 400 and 500 barrels of water per day were required to be injected into the injection well during production to maintain a satisfactory flow from the output well. The injection wellbore was 2,286 feet deep and ¾ inch in diameter and was encased with a 5½-inch casing to a depth of 2,275 feet. It contained 2,175 feet of 2-inch tubing.

A packer was placed in the annulus between the tubing and casing in the injection well at 2,175 feet and the water-base fracturing fluid containing the gum and fine sand and propping agent prepared according to the invention was pumped into the well at an average rate of 5 barrels per minute following generally the procedure described in Reissue Patent 23,733 until 96 barrels of treating fluid were in the well. The pressure during the injection of the treating or fracturing fluid was between 750 and 900 p.s.i. When variations in the pressure at the well head indicated that satisfactory fracturing had occurred, injection of the fracturing fluid was stopped.

50 barrels of crude oil of the producing field were then pumped down the tubing of the injection well at a maximum pressure of 1,200 p.s.i. to force the fracturing fluid back into the recesses and fractures of the formation. The well was then shut in for several hours at an average pressure of 250 p.s.i. and thereafter put back into production.

Immediately prior to fracturing the strata in which the composition of the invention was employed according to the procedure described in the example, the pressure necessary to force the 400 to 500 barrels of water per day into the injection well had risen to 750 p.s.i. Such high pressure on water-injection equipment is hazardous, costly and difficult to maintain. By fracturing the strata adjacent to the injection well according to the example, the pressure required to maintain 400 to 500 barrels of water input per day dropped to only 100 to 200 p.s.i. Such reduction in the pressure required to force water through the adjacent strata shows the success of the fracturing operation which resulted from employing the low fluid-loss composition of the invention.

Advantages of the invention, in addition to the marked increase in permeability of producing and water-flood strata through which and adjacent to which the injection well passed, are the relatively small quantity and low cost of the gum and fine mineral required for the invention.

Although the example concerned the injection of the fracturing fluid of the invention in an input well, it is equally applicable in fracturing operations where the fracturing composition is injected into the producing well to increase oil or gas production therefrom.

Benefits to be derived from the practice of the invention, therefore, are improved operating conditions increased yield of oil, and relatively low costs for materials which are readily available and employed in small quantities.

Having described our invention, what we claim and desire to be protected by Letter Patent is:

1. The method of fracturing a formation traversed by a well consisting of injecting down the well bore of the well a composition consisting essentially of a dispersion in water of a water soluble gum and finely divided water inert solids having a maximum particle size of less than 6 microns, the relative proportions of said gum and said solids being within the ranges of about 20 to about 90 parts of gum and from about 10 to about 80 parts of solids, the total combined amounts of said gum and said solids being sufficient to substantially reduce the fluid loss to said formation below that obtained with an equal amount of either said gum or said solids alone; subjecting the composition to a pressure sufficient to fracture the formation; and thereafter releasing said pressure.

2. The method according to claim 1 wherein the water-soluble gum is guar gum.

3. The method according to claim 1 wherein the water-soluble gum is a pulverized polyacrylamide.

4. The method according to claim 1 wherein the water-soluble gum is a polymerized water-soluble salt of acrylic acid.

5. The method according to claim 1 wherein the finely divided water inert solids are pulverized silica.

6. The method of increasing fluid flow from a fluid bearing formation traversed by a well consisting of (1) injecting down the wellbore of the well a composition consisting essentialy by weight, per 1000 gallons of said composition, of between about 3.5 and about 166 pounds of guar gum having a particle size of between about 20 and about 200 mesh, between about 1 and about 100 pounds of pulverized silica having a particle size of between 1.5 and 6.0 microns, and between 500 and 10,000 pounds of flint-shot sand having a particle size of between 20 and 60 mesh, and balance about a 5 to about 25 percent by weight aqueous solution of HCl; (2) subjecting the composition to a pressure sufficient to fracture said formation; (3) injecting an oil down said wellbore to force said composition back into the fractured formation;

(4) releasing said pressure; and (5) putting the well back into production by reducing the pressure in the wellbore sufficiently below that of the formation pressure to cause fluid in the formation to flow into and up the wellbore to the earth's surface.

7. A low fluid-loss well-treating composition consisting essentially by weight of between about 3.5 and 166 pounds of a water-soluble gum having a particle size between about 20 and about 200 mesh and between about 1 and about 100 pounds of a water-insoluble and oil-insoluble particulate mineral material having a particle size of between about 1.5 and about 6.0 microns selected from the class consisting of pulverized silica, alumina, Portland cement, barytes, igneous rock, feldspar and plaster of Paris in an aqueous solution selected from the class consisting of water and about a 5 to about 25 percent by weight aqueous solution of an inorganic acid in sufficient amount to make 1000 gallons of said composition.

8. The well-treating composition of claim 7 wherein the water-soluble gum is guar gum.

9. The well-treating composition of claim 7 wherein the water-soluble gum is pulverized polyacrylamide.

10. The well-treating composition of claim 7 wherein the water-soluble gum is a polymerized water-soluble salt of acrylic acid.

11. The well-treating composition of claim 7 wherein the water-insoluble particulate mineral material is pulverized silica.

References Cited in the file of this patent
UNITED STATES PATENTS

| | | |
|---|---|---|
| 1,999,766 | Lawton et al. | Apr. 30, 1935 |
| 2,337,296 | Kennedy et al. | Dec. 21, 1943 |
| 2,364,434 | Foster | Dec. 5, 1944 |
| 2,678,697 | Fischer | May 18, 1954 |
| 2,681,704 | Menaul | June 22, 1954 |
| 2,702,788 | Dawson | Feb. 22, 1955 |
| 2,718,497 | Oldham et al. | Sept. 20, 1955 |
| 2,779,735 | Brown et al. | Jan. 29, 1957 |
| 2,801,218 | Menaul | July 30, 1957 |
| 2,854,407 | Mallory | Sept. 30, 1958 |